June 7, 1938.  L. H. BLOOD  2,119,902
MACHINE TOOL TRANSMISSION AND CONTROL MECHANISM
Filed Sept. 27, 1934  6 Sheets-Sheet 1

Inventor
LOUIS H. BLOOD
By A. H. K. Parsons
Attorney

June 7, 1938.   L. H. BLOOD   2,119,902
MACHINE TOOL TRANSMISSION AND CONTROL MECHANISM
Filed Sept. 27, 1934   6 Sheets-Sheet 2

Inventor
LOUIS H. BLOOD
By AHKParsons
Attorney

June 7, 1938.  L. H. BLOOD  2,119,902

MACHINE TOOL TRANSMISSION AND CONTROL MECHANISM

Filed Sept. 27, 1934  6 Sheets-Sheet 4

Inventor
LOUIS H. BLOOD
By H. K. Parsons
Attorney

Patented June 7, 1938

2,119,902

UNITED STATES PATENT OFFICE 2,119,902

MACHINE TOOL TRANSMISSION AND CONTROL MECHANISM

Louis H. Blood, Cincinnati, Ohio, assignor to The Cincinnati Milling Machine Company, Cincinnati, Ohio, a corporation of Ohio Application September 27, 1934, Serial No. 745,773

17 Claims. (Cl. 60—52)

This invention relates to machine tools and more particularly to improvements in the transmission and control mechanism thereof.

One of the objects of this invention is to provide a transmission which is hydraulic in nature but which may be easily and readily adjusted in a similar manner to mechanical transmissions to yield a plurality of feed rates which are in stepped relation and therefore similar to those yielded by variable speed gear transmissions.

Another object of this invention is to provide in combination with a variable speed hydraulic transmission in which variable rates are obtained by selectively adding or subtracting the flow from one or more of a plurality of pumps of a single unitary control for determining the pumps to be actuated, and the manner in which those pumps are to be connected with the main supply line.

A further object of this invention is to provide in a transmission of the class described a preselective means for determining the number of pumps to be actuated in order to yield a desired rate and subsequently actuated means for simultaneously coupling the selected pumps for power actuation.

Other objects and advantages of the present invention will be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference characters indicate like or similar parts.

Figure 1:
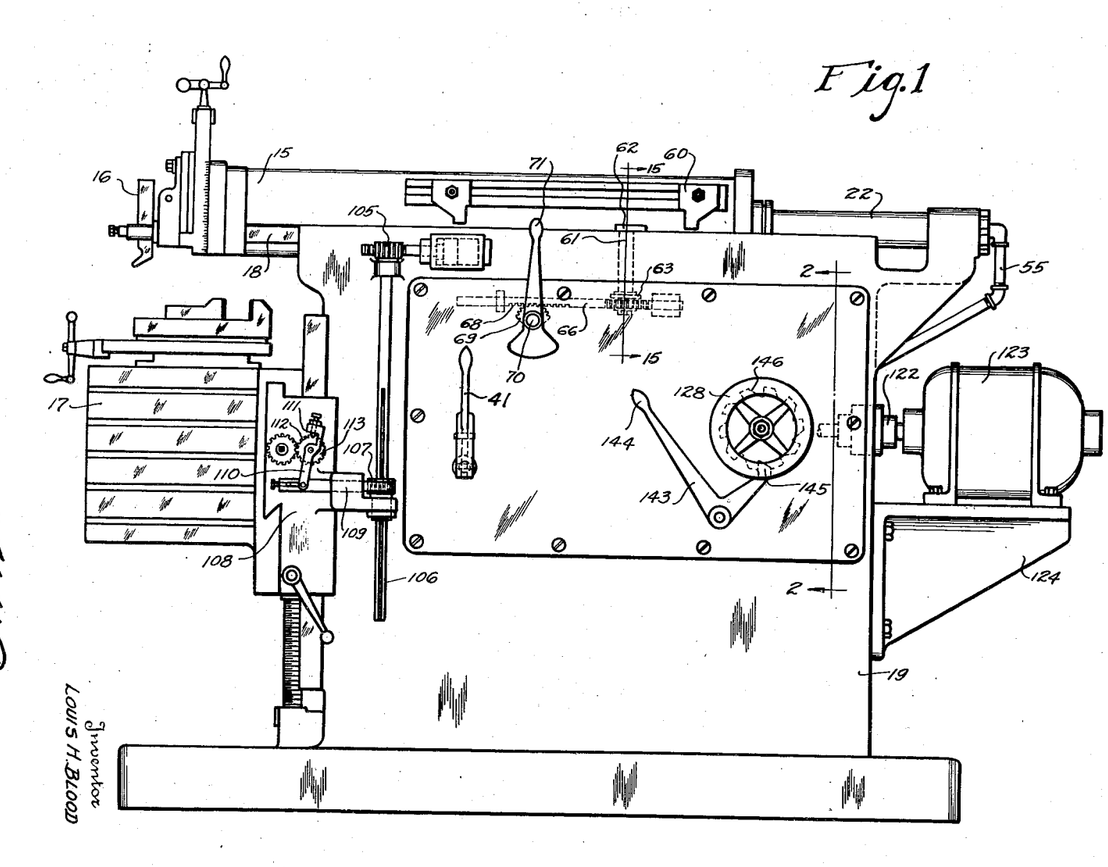
Figure 1 is an elevation of a machine tool embodying the principles of this invention.

Although this invention has numerous other applications, it has been exemplified in connection with a shaping machine in which a reciprocable member such as the tool slide 15, as shown in Figure 1, is moved in one direction at a prescribed feed or cutting rate and returned in the opposite direction at a quick traverse rate.

The slide 15 may be provided at one end with suitable conventional means for supporting a cutting tool 16 for movement relative to a work support 17. The slide 15 may be provided with ways 18 by which the same is supported and guided for reciprocation relative to the fixed bed or support 19 of the machine.

Figure 13:
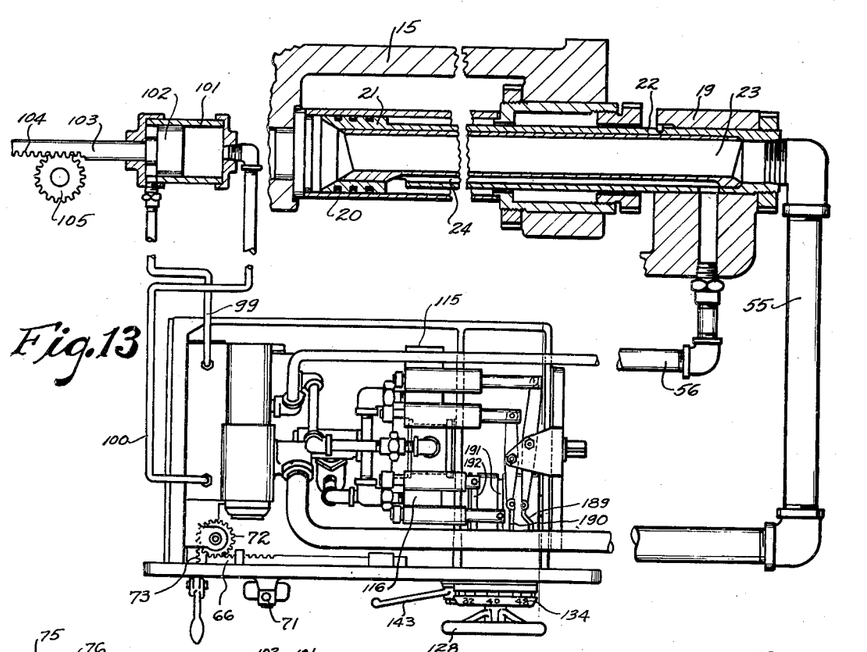
Figure 13 is a view showing the manner of connecting the hydraulic unit to the operating cylinder and the pick feed cylinder.

As shown in Figure 13 the slide 15 may be reciprocated by means of an hydraulic motor comprising a cylinder 20 which is fixed in the slide for movement therewith and a differential piston 21 which is fixed to the support 19 by a piston rod 22. The piston rod has a central bore 23 through which fluid is admitted to the left end of the cylinder for effecting feed rates and a second longitudinal bore 24 through which fluid is admitted to the right hand end of the cylinder for effecting quick traverse return movements of the tool slide. Due to the large diameter of the piston rod, it will be apparent that if the same volume of fluid is delivered per unit of time and alternately to opposite ends of the cylinder, that the advancing or feeding rate will be very much slower than the return rate. By means of this arrangement it is possible to utilize the same pump for effecting a slow feeding rate and a rapid return rate.

An improved hydraulic circuit has been provided for supplying fluid to the cylinder in such a manner as to yield a plurality of forward feeding rates as well as a quick traverse return rate and in which the feed rates may be selectively changed in steps similar to a change gear mechanical transmission. In principle the feed transmission contemplates the provision of a main hydraulic flow of constant predetermined volume which will yield an intermediate feed rate, and of auxiliary means for adding to or subtracting from said main flow predetermined volumetric flows which, when adding to or subtracting from the main flow, will increase or decrease the final rate in steps above or below said intermediate rate.

Figure 14:
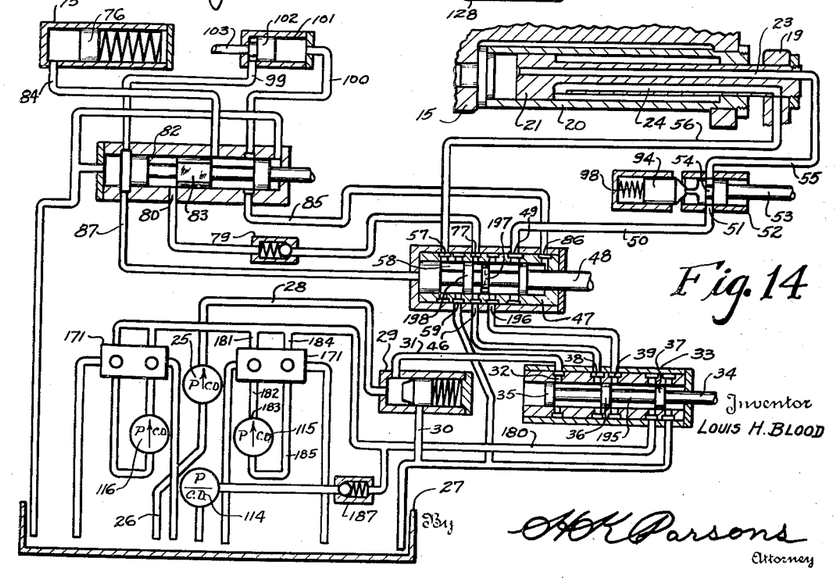
Figure 14 is a diagrammatic view of the hydraulic circuit.

To this end a main or principal constant displacement pump 25, as shown in Figure 14, is provided for delivering the main hydraulic flow to the cylinder which, when acting alone, will yield the intermediate feed rate. This pump has an intake 26 for withdrawing fluid from the main reservoir 27 and a delivery pipe 28 through which fluid is forced at a constant volumetric rate to the cylinder. Channel 28 may be connected to a conventional form of emergency relief valve 29 by means of which part of the fluid may be bypassed to reservoir through a channel 30 in case of emergency.

The flow from the relief valve continues through line 31 to port 32 of a stop valve 33.

Figure 7:
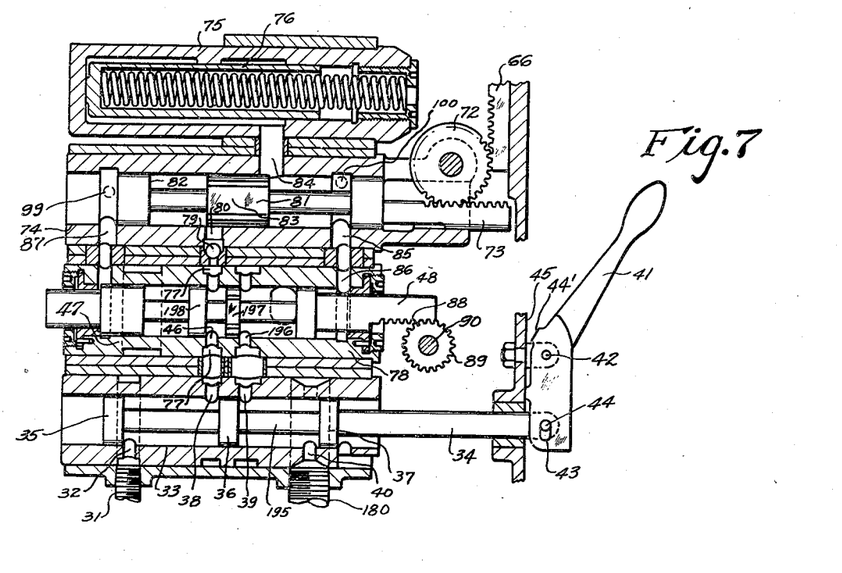
Figure 7 is a section through the valve mechanism as viewed on the line 7—7 of Figure 4.

This valve, as more particularly shown in Figure 7, has a reciprocable plunger 34 on which is formed three spools 35, 36 and 37 which spools act when the plunger is in the running position as shown to inter-connect port 32 with port 38 and also to connect port 39 with port 40. The plunger is pulled outward from position shown by means of a stop lever 41 which is pivotally mounted on the fixed pin 42 and operatively connected by an elongated slot 43 formed in the lower end thereof with a fixed pin 44 in the end of plunger 34. From this it will be seen that counter-clockwise movement of the lever 41 will pull the plunger 34 toward the right until the stop 44' abuts the wall 45. This movement is sufficient to move the spools 35 and 36 to such a position that they will inter-connect ports 38 and 39 and simultaneously connect ports 32 and 40 to reservoir.

The flow from port 38 will continue through an intermediate passage to port 46 of the rate and direction control valve 47. This valve has a plunger 48 through which the fluid passes to port 49 and channel 50, the channel terminating in a port 51 of valve 52. This valve has a plunger 53 in which is formed an annular groove 54 through which the fluid passes when the valve is in the position shown in Figure 3 to the feed line 55. This feed line is connected to the end of the central bore 23 of the piston rod, as more particularly shown in Figure 13. Operation of the pump 25 will therefore cause forward movement of the tool slide at a definite predetermined feed rate because the pump 25 is a constant displacement pump and driven at a uniform rate.

As the cylinder advances relative to the piston rod, the fluid in the right end of the cylinder will escape through the bore 24 in the piston rod and the pipe 56 connected therewith as shown in Figure 13 to port 57 of the rate and direction control valve. This port, as shown in Figure 14, is connected by the cannelure 58 of plunger 48 when the same is in the feed position as shown in Figures 7 and 14 to the return port 59. This return or exhaust port permits the fluid to return to the main reservoir 27.

Figures 3, 15:
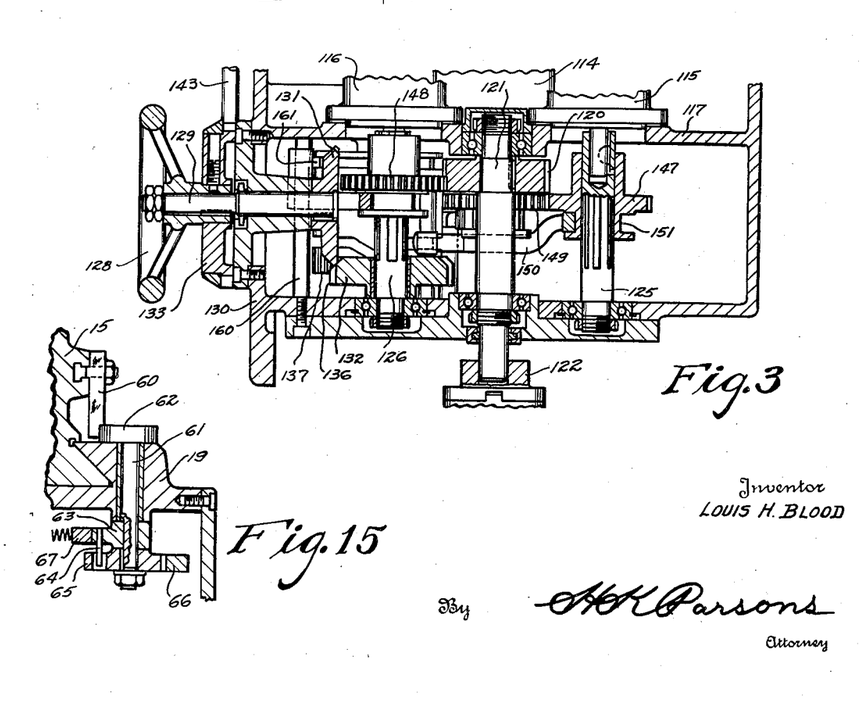
Figure 3 is a section on the line 3—3 of Figure 2.
Figure 15 is a section on line 15—15 of Figure 1.

When the tool slide has advanced a predetermined amount as determined by a trip dog 60 fixed to the side of the slide 15, the trip dog will rotate a trip plunger 61 through the medium of a trip lever 62 attached to the upper end of the plunger and extending into the path of the dog. The lower end of the plunger has an arm 63 secured thereto as shown in Figure 15 which carries a pin 64 having a lost motion connection with a segment member 65. This latter member inter-meshes with a reciprocable rack bar 66. A spring pressed detent 67 inter-engages with suitable formed V-shaped indents in the member 63 to complete the firing in the well-known manner of load and fire mechanisms.

The rack bar 66 extends longitudinally of the machine as shown in Figure 1 and has rack teeth 68 formed on the under side thereof for inter-engagement with a segment 69 keyed to the inner end of shaft 70 which has a manually operable lever 71 secured to the outer end thereof. This lever serves as a manual means for operating the detent mechanism and thereby manually controlling the reversing of the machine.

The rack bar 66 inter-meshes with a pinion 72 as more particularly shown in Figure 7, which pinion also inter-meshes with a plunger 73 of a pilot valve 74. Attention is invited to the fact that the rack 66 and pinion 72 have been thrown up through an angle of 90 degrees for the purposes of illustration because if shown in a true position the pinion 72 would lie directly behind the plunger 73. The true relationship of these parts is shown in Figure 13.

The pilot valve 74 serves to control power shifting of the rate and direction control valve. Power for this purpose is obtained from an accumulator 75 containing a spring loaded plunger 76. The accumulator is loaded in the following manner. The port 46 in Figure 7, it will be remembered, is connected at all times to the main pump during operation of the machine, and therefore this port is always under pressure. The port 46 is formed in the annular groove 77 circumscribing the sleeve 78 which groove lies in the plane of a ball check valve 79, the fluid flowing past this valve escaping into the bore containing plunger 73. Since the flow of oil around the annular groove 77 is unaffected by the position of the rate and direction valve plunger 48, the flow past the check valve will be continuous during operation of the main pump 25. This fluid passes through a port 80 in the pilot valve, which port is controlled by the spool 81 secured to the plunger 73. It will be noted from the position of the parts in Figure 7 that the port 80 is open a small amount permitting fluid to flow into the cannelure 82 from which it passes through the space formed by the flattened sides 83 of spool 81 to the port 84 of the accumulator. When the plunger 73 is in the process of moving from one extreme position to the other, the port 80 is closed but the flattened sides 83 permit flow from the accumulator to the cannelure 82.

Figure 9:
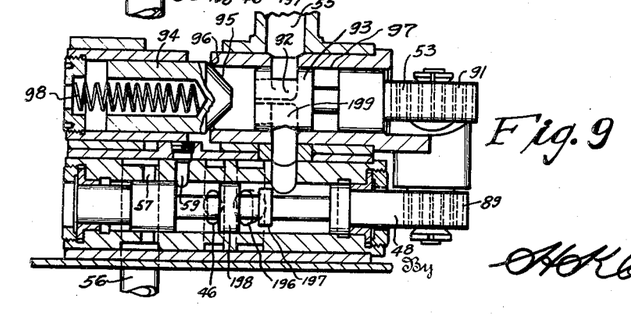
Figure 9 is a section similar to Figure 8 but with the valve plungers shifted to a rapid traverse position.

The cylinder 74 which contains plunger 73 has a port 85 which is inter-connected with port 84 of the accumulator when the plunger is in the position shown to permit passage of fluid to port 86 formed in the right hand end of the rate and direction control valve for shifting the plunger 48 to its extreme left position which may be termed the feed forward position. Upon operation of the trip plunger, the rack bar 66 will, through the pinion 72, cause reciprocation of the plunger 73 to its extreme left position, thereby interconnecting port 84 of the accumulator with port 87 which admits fluid to the left end of the rate and direction valve, thereby shifting the plunger 48 to the right or to its rapid return position, which position is shown in Figure 9. This will disconnect the port 46 from port 49 and couple port 46 with port 57 and line 56 and thereby will connect the pump 25 for rapid return movement of the tool slide.

Figure 8:
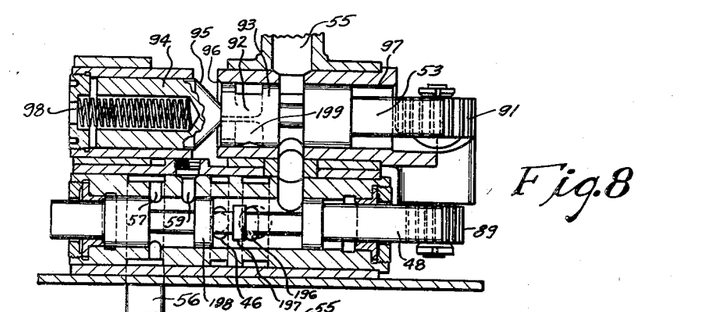
Figure 8 is a section on the line 8—8 of Figure 4.

The plunger 48 has rack teeth 88 formed in the end thereof which inter-mesh with a pinion 89 secured to the end of shaft 90. This shaft, as shown in Figure 8 has a second pinion 91 secured thereto which intermeshes with rack teeth formed on the end of plunger 53. The purpose of this is that when the rate and direction control valve is shifted to its rapid traverse position, it will simultaneously cause shifting of plunger 53 and thereby interconnect the line 55 with the reservoir. This is accomplished by providing an L-shaped passage 92 in the spool 93 secured to the end of plunger 53. In order, however, to prevent all of the oil from draining out of the passage 55 during the rapid return movement, a spring pressed plunger 94 is provided which has a cone-shaped end 95 adapted to inter-fit a cone-shaped counter-sink in the end of the sleeve 97 which contains the plunger 53. When the plunger 53 shifts to the position shown in Figure 9, the plunger 94 will tend to close the escape of oil through the passage 92 and will act in a manner of a check valve whereby when the pressure in the line 55 drops below that sufficient to move plunger 94 against the spring 98, the cone-shaped end 95 will shut off the further escape of oil. This will maintain the pipe 55 filled with oil at all times and prevent the accumulation of air in the hydraulic system.

Means have also been provided whereby each change in direction of the tool slide will operate a ratchet pick feed mechanism for translating the work slide laterally of the tool slide. To this end the pilot valve has a pair of channels 99 and 100 connected to ports 85 and 87 so that these channels will be alternately under pressure as plunger 73 is shifted between its two positions. The channel 99 is connected to one end of a cylinder 101 containing a piston 102 having a piston rod 103 on which is formed rack teeth 104 inter-meshing with a pinion 105. This pinion, as shown in Figure 1, is secured to the upper end of a spline shaft 106 which inter-engages a pinion 107 carried by the knee 108 which in turn carries the work support. The pinion 107 inter-meshes with a rack bar 109 which is operatively connected through lost motion means with a ratchet lever 110 having a spring pressed ratchet pawl 111 which inter-engages with teeth 112 formed on the wheel 113. From this it will be seen that when the plunger 73 is shifted to the position shown in Figure 7 to cause a forward feeding movement, that pressure is also admitted to channel 100 which will shift the plunger 102 to its extreme left position, thereby rotating pinions 105 and 107 thereby causing the bar 109 to move toward the right as viewed in Figure 1 to actuate the lateral feed. When the end of the feeding stroke is reached and reversal takes place, the channel 99 will be put under pressure, causing shifting of plunger 102 and thereby moving the pawl to a return position preparatory to a new pick feed movement.

Figure 2:
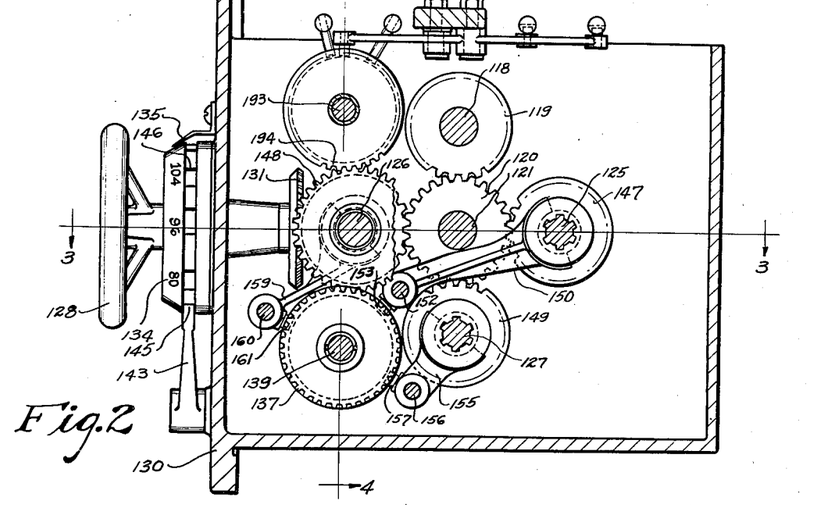
Figure 2 is a section through the control mechanism as viewed on line 2—2 of Figure 1.

From the description thus far, only the means for obtaining one feed rate has been described which is that yielded by the pump 25 which may be arbitrarily assumed, for purposes of description, as 40 feet per minute, and the means for increasing or decreasing this rate by predetermined steps will now be described. This means comprises a plurality of auxiliary pumps such as 114, 115 and 116 which may be arranged in the same manner as the drive shafts are shown in Figure 2.

Figure 4:
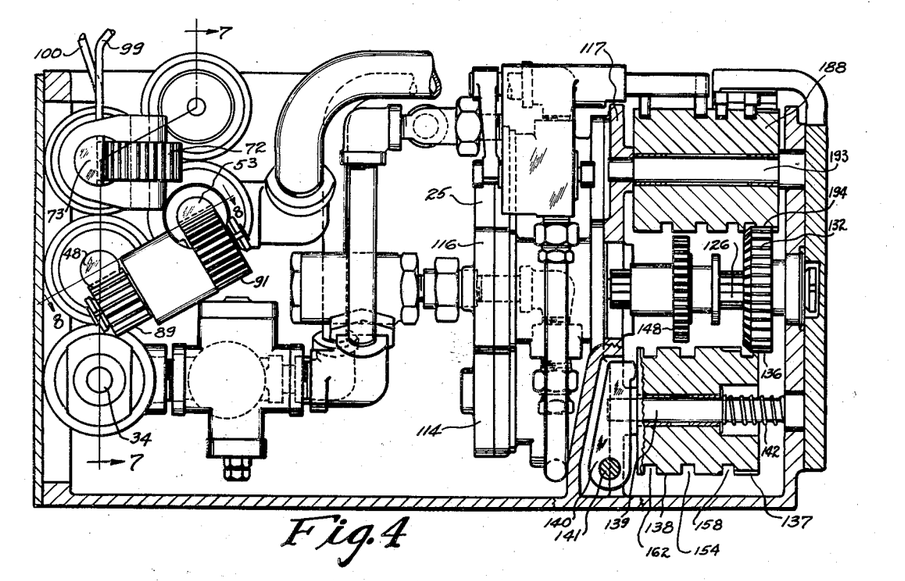
Figure 4 is a section on the line 4—4 of Figure 2 showing the arrangement of the valving and the control mechanism.

For instance, the pump 25 is attached to the wall or partition 117 in such a manner that the drive shaft thereof is connected to the end of a shaft 118 anti-frictionally journaled in the casing and carrying a fixed gear 119 which inter-meshes with a common drive gear 120. The drive gear 120 is keyed to a shaft 121 as more particularly shown in Figure 3, and has one end projecting beyond the wall of the casing for inter-connection as by an Oldham coupling 122 to a prime mover 123 mounted on a bracket 124 at the rear of the machine as shown in Figure 1. The pumps 115 and 116 as shown in Figure 3 are also supported on the partition 117 with their shafts projecting therethrough and operatively connected to drive shafts 125 and 126 respectively. The pump 114 is also supported on the partition 117 as shown in Figure 4 and is connected for actuation by a shaft 127, Figure 2. These pumps are of different capacity whereby they may be combined in various combinations with the main pump to produce a sufficient number of steps or graduations in the feed rate and the total range of the feed rate will depend upon the individual capacities chosen for the auxiliary pumps. As illustrative of suitable capacities, the pump 116 may be considered as having a capacity sufficient to yield a feed rate of 8 feet per minute; the pump 115, a feed rate of 16 ft. per minute, and the pump 114 a feed rate of 40 ft. per minute. By coupling pumps 115 and 116 for subtraction of flow from the main line, a minimum feed rate of 16 ft. per minute may be obtained and if all of the pumps are connected for delivering fluid into the supply line a maximum feed rate of 104 ft. per minute may be obtained.

It will be noted from Figure 4 that all of the pumps and valve mechanism are mounted in a container which also serves as a reservoir and this container may be inserted into or withdrawn from the body of the machine as a unit. This eliminates the necessity for return connections such as pipes from the exhaust ports of the various valves.

A control mechanism has been provided for not only coupling and uncoupling the various auxiliary pumps for actuation by the prime mover, but also for positioning the individual control valves of pumps 115 and 116 for causing these pumps to either add to or subtract from the main flow, as well as making an additional connection whereby these pumps will be rendered ineffective. To this end a hand wheel 128 is secured to the end of a shaft 129 rotatably journaled in the wall 130 of the container and having keyed to the inner end thereof a bevel gear 131 which intermeshes with a similar bevel gear 132. A dial 133 is also secured for rotation with the hand wheel and carries suitable numerals such as 134 which cooperate with a fixed pointer 135 to indicate the feed rate setting of the mechanism. From this it will be seen that by rotation of the hand wheel the entire series of feed rates may be successively obtained.

The bevel gear 132 is mounted for free rotation on the shaft 126 as shown in Figure 3, and this gear has integrally formed therewith a spur gear 136 which intermeshes with a spur gear 137 formed integrally on the end of a cam drum 138, Figure 4. This cam drum is mounted for free rotation on a shaft 139 and is also axially movable on this shaft by means of a lever 140 which is fixed to the end of a rotatable shaft 141. A spring 142 normally holds the cam drum in the position shown in Figure 4 and with the teeth of the spur gears 136 and 137 intermeshed.

The shaft 141 projects through the front wall of the unit and has an L-shaped lever 143 secured thereto, the end of one arm of which constitutes a hand grasp 144 and the end 145 of the other arm of the lever being V-shaped to interfit with a plurality of V-shaped indents 146 which are equal in number to the number of feed rates. This lever acts as a sort of interlock between the hand wheel and the cam drum in such a way that the cam drum must be shifted in order to permit rotation of the hand wheel and in shifting the cam drum the various pump drive gears are disconnected from the prime mover so as to reduce the friction and load on the hand wheel during rotation thereof. The spring 142 has the dual function of shifting the cam drum to reengage the selected gears and also operates through the lever to interconnect the detents and act as a means for holding the hand wheel in a selected position and to prevent rotation thereof until the hand lever is shifted.

The function of the cam 138 is to connect the auxiliary pumps to the prime mover only when they are actually utilized to vary the feed rate, thereby preventing needless circulation of the oil and consequent heating thereof resulting in an efficient and economical structure. To this end the various pumps are provided with individual shiftable gears for connecting and disconnecting the various pumps with the common drive gear 120. For instance, the shaft 125 shown in Figure 3 has splined thereon a shiftable gear 147 for connecting and disconnecting pump 115; the shaft 126 has splined thereon a shiftable gear 148 for connecting and disconnecting pump 116; and shaft 127 has splined thereon a shiftable gear 149 for connecting and disconnecting pump 114. The means for shifting these gears comprises a shifter fork 150 engaging an annular groove 151 in gear 147 and supported for sliding movement on a shaft 152. The fork also has integral therewith a follower 153 adapted to ride in a cam path 154 formed on the cam drum 137. The gear 149 is shifted by a fork 155 mounted for sliding movement on a rod 156 and having a follower 157 which engages a cam groove 158. Likewise, the gear 148 is shifted by a fork 159 slidably mounted on rod 160 and having a follower 161 engaging a cam groove 162 formed in the drum.

Figure 6:
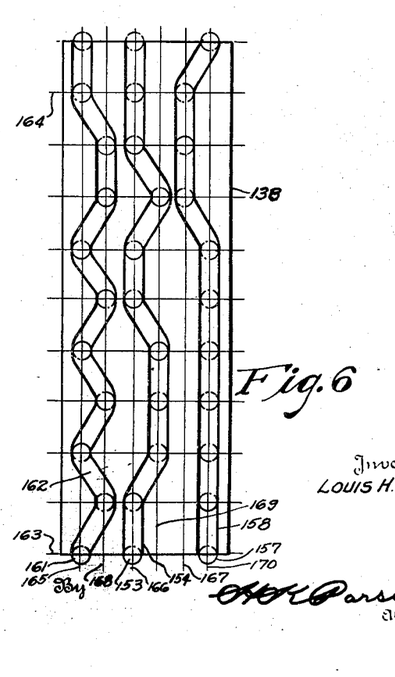
Figure 6 is an expanded view showing the cam paths in the cam unit which determines the coupling of all the auxiliary pumps for actuation by the prime mover.

The various cam grooves are shown rolled out in Figure 6 and the dash and dot line 163 indicates the position of the various followers for yielding the lowest feed rate, while the dash and dot line 164 indicates the position of the followers for yielding the highest feed rate, and the intermediate lines indicate the position of the followers for the various intermediate rates. In the lowest rate position it will be noted that the follower 157 is in a position to disconnect gear 149 from the common drive gear 120 while the followers 153 and 161 are in a position to connect gears 147 and 148 respectively to the common drive gear. In other words, the ordinates 165, 166 and 167 correspond to the engaged position of the gears and the ordinates 168, 169 and 170 correspond to the disengaged position of the gears.

In addition to providing for operation of the pumps only when needed, means have also been provided for determining whether the auxiliary pumps 115 and 116 shall function in an additive or subtractive manner. In other words, each pump is provided with separate valve mechanisms which may be adjusted to cause the pump to deliver into the main line or withdraw fluid therefrom. These valves are shown in Figures 10, 11 and 12 and the manner of operation will now be described.

Figure 10:
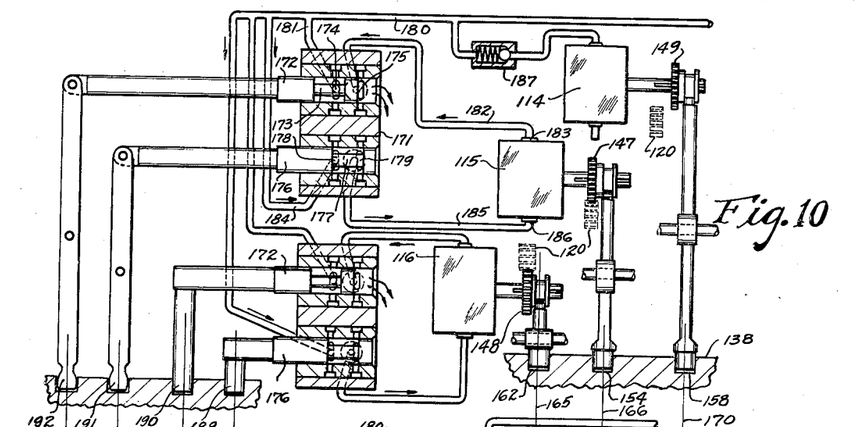
Figure 10 is a partially diagrammatic view showing the arrangement of parts for yielding the lowest feed rate of which the transmission is possible.

The reference numeral 171 indicates one of these valves which has a first plunger 172 in which is formed a cannelure 173 and movable to two different positions with respect to ports 174 and 175, one of which positions is shown in Figure 10 in which the port 175 is connected to reservoir and the port 174 is closed. The other position which the plunger 172 may assume is shown in Figure 12 in which the cannelure 173 interconnects ports 174 and 175.

Figure 12:
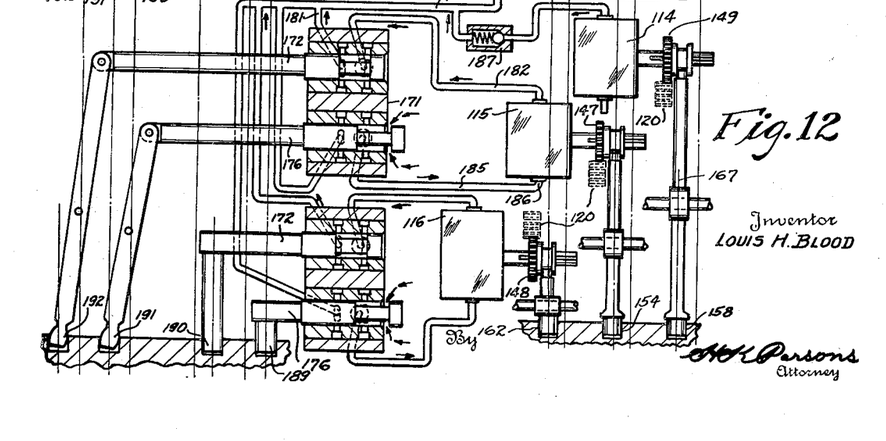

A second plunger 176 is slidably mounted in the valve and has a cannelure 177 formed therein which, as shown in Figure 10, will inter-connect ports 178 and 179 while upon movement to a second position as shown in Figure 12 the port 178 will be closed and the port 179 will be connected to reservoir. A common channel 180 serves to connect these valves to port 40 of the stop valve 33. The port 174 is connected through branch 181 to channel 180 and the port 175 is connected through channel 182 to the delivery port 183 of the auxiliary pump, such as 115. Port 178 is connected by branchline 184 to the common channel 180 and the port 179 is connected by the branch line 185 to the intake port 186 of the auxiliary pump 115. In the position of the valve plungers associated with pump 115 in Figure 10, the pump is so connected that it will withdraw fluid from channel 180. In other words, the fluid will flow from channel 180 through branch 184, port 178, cannelure 177, port 179, branch 185 to the intake port 186 of pump 115 and be forced out through the delivery port 183, channel 182, port 175 to reservoir.

Figure 11:
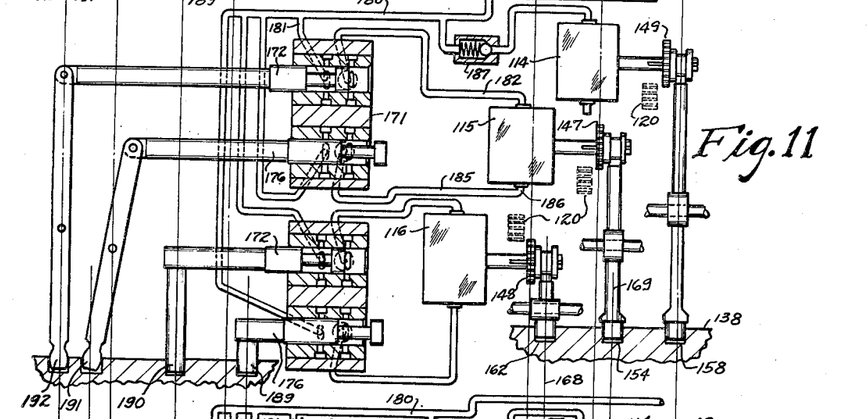
Figures 11 and 12 are views similar to Figure 10 but with the parts shifted to other positions to yield additional representative feed rates.

If now the plunger 176 is shifted to the position shown in Figure 11 while the plunger 172 remains in the same position, it will be seen that both ports 174 and 178 are disconnected from pump 115 so that although this pump is idle and disconnected from the common drive gear, still the pressure of the fluid in channel 180 cannot escape through the pump in any manner whereby this pump is rendered ineffective. If the plunger 176 is now maintained in the same position and the plunger 172 is shifted to the right, the port 174 will be interconnected with port 175 and the port 179 will be connected to reservoir; and since this valve is submerged in oil, as previously explained, the intake side of pump 115 will withdraw oil from the reservoir through port 179, channel 185 and intake port 186 and force the fluid out through delivery port 183, channel 182, port 175, cannelure 173, port 174, branch 181 into the common line 180, the pump thereby acting to add fluid to the feed line. In other words, in Figure 10 the pump 115 is shown connected to the common line 180 in a manner to subtract fluid therefrom; in Figure 11 pump 115 is shown connected in such a manner that it is ineffective; and in Figure 12 the pump is shown connected in such a manner that it will add fluid to the line 180. The same connections can be made in connection with pump 116 so that further description thereof is not believed to be necessary. The pump 114 is utilized only for the purpose of adding fluid to the line, and therefore is merely connected to the line through a check valve 187 so that when the pump is delivering, it will force fluid past the check valve; but when stationary, the check valve will prevent escape of fluid from line 180 back through the pump.

Figure 5:
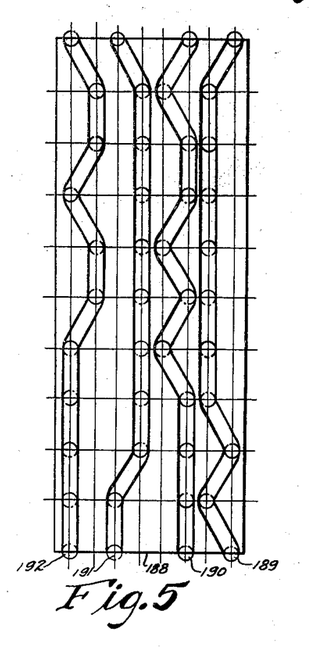
Figure 5 is an expanded view showing the arrangement of the cam paths in the cam unit which controls the valves for coupling and uncoupling the auxiliary pumps in a manner to increase or decrease the feed rate.

The cam drum 188 shown rolled out in Figure 5 has cam grooves 189 and 190 for controlling the positioning of the plungers 176 and 172 respectively for pump 116, and the cam grooves 191 and 192 for controlling the positioning of the plungers 176 and 172 for the control valve of pump 115. The actual arrangement of the cam grooves and plungers controlled thereby is shown in Figure 13 and to avoid misunderstanding in the interpretation of Figures 10, 11 and 12 which are somewhat diagrammatic, the cam grooves 189 to 192 inclusive in Figure 5 must be considered as turned over in their individual positions because the valves 171 are on the right hand side of the cam drum, Figures 10, 11 and 12, rather than on the left hand side as shown in Figure 13.

Cam drum 188 is mounted for free rotation on a shaft 193 and is provided with spur gear teeth 194 on the end thereof for inter-meshing with the spur gear 136 whereby the drum 188 may be simultaneously rotated with the drum 138 upon rotation of the hand wheel 128.

It will now be seen that when the feed rate is to be changed, that the lever 144 is moved in a clockwise direction to release the hand wheel 128 and shift the cam 138 against the resistance of spring 142 to thereby move all of the shiftable gears out of engagement with the gear 120 so that the drums may be rotated with a minimum of friction. Rotation of the two drums will properly position the plungers of the control valves 171 and will also preselect the shiftable gears which are to be engaged with gear 120.

The flow from line 180 passes through port 40 of the stop valve to port 39 by way of the cannelure 195, Figure 7, which is inter-connected by an intermediate passage to port 196 of the rate and direction valve. This valve has a spool 197 which is flattened out on the sides to permit the flow from port 46 to combine with the flow from port 96 before it passes to the pipe 85 for actuation of the tool slide. It will be seen, however, that when the plunger 48 of the rate and direction valve is shifted to the right that the port 46 will be disconnected by the spool 198 from the channel 55, but that the spool 197 will permit the flow from the auxiliary pumps to pass into channel 55, but the plunger 53 will also be shifted to the right at this time and the delivery from the auxiliary pumps will pass through a second L-shaped opening 199 formed in the end of plunger 53 to reservoir. Thus the main pump may be utilized for returning the slide at a rapid traverse rate and the auxiliary pumps momentarily connected to reservoir during this time.

It will thus be seen that an improved transmission and control mechanism of an hydraulic nature has been provided for the operation and control of a machine tool slide.

What is claimed is:

1. In a machine tool having a fluid operable motor for actuating a slide thereof, a first pump, and a channel for connecting said pump to the motor, the combination of a plurality of auxiliary pumps for varying the quantity of flow in said channel including valve means for determining the pumps to be placed in communication with said channel, a common actuating means for the pumps, and a control mechanism having a first part operable for determining the pumps to be actuated, and a second means for conditioning the valve means of the actuated pumps whereby only the pumps that are placed in communication with said channel are actuated.

2. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable means for selectively coupling the auxiliary pumps to the prime mover, a first cam means for shifting said valve means, a second cam means for shifting said coupling means, and a control mechanism for actuating both of said cam means.

3. In a machine tool having a fluid operable motor for effecting relative movement between a tool and a work piece, and a pump for delivering a constant flow to said motor, the combination of auxiliary means for adding to or subtracting from said flow including a plurality of devices alternatively connectible for injecting fluid into the line or withdrawing fluid therefrom, power operable means for actuating said devices, and a control mechanism for determining said alternative connections and the power actuation of the devices utilized.

4. In a machine tool having a fluid operable motor for effecting relative movement between a tool and a work piece, the combination of means for actuating said motor at a plurality of feed rates including a plurality of constant displacement pumps connectible to the motor in various combinations to yield a series of rates, a source of power, means to perselect the necessary pumps which will yield a given rate, valve means operable to connect the selected pumps with the motor, and means to connect said valve means for simultaneous adjustment with said preselecting means.

5. In a machine tool having a work support and a tool support, the combination of hydraulic means for effecting relative movement between said supports including a fluid operable motor, a constant delivery supply for said motor, a plurality of pumps, valve means for selectively connecting said pumps for increasing or diminishing said supply, actuating means for the pumps, said valve means also being operable to disconnect one or more pumps from the main flow, a control for shifting said valve means to either of its positions including means to couple for actuation only the pumps that are placed in communication with said main flow by said valve means.

6. In an hydraulic system for actuating a part, the combination of a constant volumetric flow, means for varying the volume of said flow and thereby the rate of actuation of said part including a plurality of pumps of different capacities, individual valve means for connecting the pumps severally in communication with said flow, a common control for said valve means, a prime mover, and means operatively inter-connected with said control for coupling to the prime mover only the pumps that are valve-connected to the main flow.

7. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable means for selectively coupling the auxiliary pumps with the prime mover, a first rotatable cam operatively connected for shifting said valve means, a second rotatable cam operatively connected for shifting said coupling means, and a manually rotatable member operatively connected for jointly rotating said cams.

8. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable means for selectively coupling the auxiliary pumps with the prime mover, a first rotatable cam operatively connected for shifting said valve means, a second rotatable cam operatively connected for shifting said coupling means, a manually rotatable member operatively connected for jointly rotating said cams, and a dial associated with said member for indicating the feed rates effected by the different positions of said cams.

9. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable gears for selectively coupling the auxiliary pumps to the prime mover, a first rotatable cam for shifting said valve means, a second rotatable cam for shifting said gears, a common rotator for said cams, and means for imparting an axial shift to the second cam before rotation thereof whereby all gears will be free during relative positioning thereof.

10. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable gears for selectively coupling the auxiliary pumps to the prime mover, a first rotatable cam for shifting said valve means, a second rotatable cam for shifting said gears, a common rotator for said cams, means for imparting an axial shift to the second cam to disconnect all gears from the prime mover during rotation of the cam, and an inter-lock to prevent rotation of the second cam until the same has been axially shifted.

11. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable gears for selectively coupling the auxiliary pumps to the prime mover, a first rotatable cam for shifting said valve means, a second rotatable cam for shifting said gears, a common rotator for said cams, means for imparting an axial shift to the second cam to disconnect all gears from the prime mover during rotation of the cam, and resilient means for effecting a return axial shift of said cam to re-engage the selected gears with the prime mover.

12. In a machine tool having a slide, a fluid operable motor connected thereto, a constant displacement pump and a channel connecting the pump to the motor, the combination of a plurality of auxiliary pumps, shiftable valve means for determining the auxiliary pumps to be placed in communication with said channel for varying the volumetric rate of flow therein, a prime mover, shiftable gears for selectively coupling the auxiliary pumps to the prime mover, a first rotatable cam for shifting said valve means, a second rotatable cam for shifting said gears, a common rotator for said cams, means for imparting an axial shift to the second cam to disconnect all gears from the prime mover, resilient means for effecting a return axial shift of said cam to re-engage the selected gears with the prime mover, and an interlocking member operable by the return movement of the second cam for maintaining said cam means in any given rate position.

13. In a machine tool having a work support and a tool support, the combination of hydraulic means for effecting relative movement between the supports including a fluid operable motor, a first constant delivery pump, a channel connecting said pump to the motor, a second pump, valve means having portions selectively shiftable for coupling the delivery of the second pump to said channel for increasing the rate of said relative movement, or for connecting the intake port of the second pump to said channel for decreasing the delivery to the motor and thereby the rate of said relative movement, said portions also being positionable for disconnecting said channel from the second pump, and manually operable means for positioning said portions.

14. In a machine tool having a work support and a tool support, the combination of hydraulic means for effecting relative movement between the supports including a fluid operable motor connected to one of them, a first pump, a channel connecting said pump to the motor, a second pump, valve means for determining the effect of said second pump upon the volumetric delivery to said motor including a pair of shiftable plungers, a port associated with each plunger, and respectively connected to the intake and delivery ports of said pump, a reservoir port connected with each plunger, both of said plungers having a position for inter-connecting the pump ports to reservoir, means to shift one of said plungers to connect the pump delivery port with said channel to increase the feed rate or to shift the other plunger to connect the intake port of the pump with said channel to decrease the feed rate.

15. In a machine tool having a work support and a tool support, the combination of hydraulic means for effecting relative movement between said supports including a fluid operable motor, a constant volumetric source for supplying said motor including a delivery channel therefor, a pump for varying the volume ultimately delivered to the motor, a valve having a first port connected to the delivery side of said pump, and a second port connected to the intake side of said pump, a first valve plunger for connecting the first port to said channel, and a second valve plunger for connecting the second port to reservoir to increase the volume delivered to said motor, means to shift both of said valve means to reverse the connection of said ports respectively with respect to said channel and reservoir to thereby diminish the flow delivered to said motor, said plungers also being positionable to seal said channel from both of said ports whereby the rate of operation of said motor will be determined by said constant volumetric source.

16. In a machine tool having a work support and a tool support, the combination of hydraulic means for effecting relative movement between said supports including a fluid operable motor, a supply channel therefor, a first constant displacement pump connected to said channel for effecting a predetermined rate of operation of said motor, a plurality of additional pumps having predetermined different capacities, valve means having a first position to connect the pumps severally to said channel for diminishing the flow therein to provide a first series of feed rates, a second position for connecting the pumps severally for increasing the flow in said channel to provide a second series of rates, and an additional pump selectively connectible in combination with the additional pumps either jointly or severally to produce a third series of feed rates, a rotatable cam for positioning said valve means, a prime mover, and a rotatable cam for selectively connecting with the prime mover the pumps to be utilized.

17. In a machine tool having a work support and a tool support, the combination of hydraulic means for effecting relative movement between the supports including an hydraulic motor connected to one of said supports, a channel connecting the pump to the motor, and means to vary the volume of fluid delivered by said channel to the motor including a second pump having intake and delivery ports and valve means for producing three different operative effects of said additional pump upon the flow in said channel whereby in one instance the additional pump will increase the flow in said channel; in a second instance it will decrease the flow in said channel; and in a third instance it will not disturb the flow produced in said channel by the first-named pump.

LOUIS H. BLOOD.